US 6,665,775 B1

(12) United States Patent
Maiyuran et al.

(10) Patent No.: US 6,665,775 B1
(45) Date of Patent: Dec. 16, 2003

(54) CACHE DYNAMICALLY CONFIGURED FOR SIMULTANEOUS ACCESSES BY MULTIPLE COMPUTING ENGINES

(75) Inventors: Subramaniam Maiyuran, Gold River, CA (US); Salvador Palanca, Gold River, CA (US)

(73) Assignee: Intel Corporation, Santa Clara, CA (US)

( * ) Notice: Subject to any disclaimer, the term of this patent is extended or adjusted under 35 U.S.C. 154(b) by 205 days.

(21) Appl. No.: 09/667,688

(22) Filed: Sep. 22, 2000

(51) Int. Cl.[7] .............................................. G06F 12/08
(52) U.S. Cl. ...................... 711/129; 711/3; 711/128; 711/130; 711/131
(58) Field of Search ............................ 711/3, 128, 129, 711/130, 131, 211

(56) References Cited

U.S. PATENT DOCUMENTS

| | | | |
|---|---|---|---|
| 5,434,989 A | * | 7/1995 | Yamaguchi .................... 711/3 |
| 5,553,262 A | | 9/1996 | Ishida et al. |
| 5,761,720 A | | 6/1998 | Krishnamurthy et al. |
| 5,860,158 A | | 1/1999 | Pai et al. |
| 5,909,704 A | * | 6/1999 | Ireland ........................ 711/219 |
| 5,911,149 A | * | 6/1999 | Luan et al. ................... 711/147 |
| 6,038,647 A | * | 3/2000 | Shimizu ....................... 711/168 |
| 6,122,708 A | * | 9/2000 | Faraboschi et al. .......... 711/118 |
| 6,161,166 A | | 12/2000 | Doing et al. |
| 6,173,367 B1 | | 1/2001 | Aleksic et al. |
| 6,223,255 B1 | * | 4/2001 | Argade ........................ 711/129 |
| 6,314,490 B1 | * | 11/2001 | Morein .......................... 711/3 |
| 6,493,800 B1 | * | 12/2002 | Blumrich ..................... 711/129 |

FOREIGN PATENT DOCUMENTS

| | | |
|---|---|---|
| EP | 0 881 575 A1 | 12/1998 |
| JP | 08 272681 A1 | 10/1996 |
| WO | WO 01/61500 A1 | 2/2000 |

OTHER PUBLICATIONS

Related U.S. patent application Ser. No. 09/750,750 filed Dec. 27, 2000.

* cited by examiner

Primary Examiner—Gary Portka
(74) Attorney, Agent, or Firm—Kenyon & Kenyon

(57) ABSTRACT

A cache has an array with single ported cells and is dynamically accessible simultaneously by multiple computing engines. In a further embodiment, the cache also has a tag array including a first address input, a second address input, and a shared mode input, and a data array electrically coupled to the tag array and including a first address input, a second address input, and a shared mode input.

27 Claims, 7 Drawing Sheets

CACHE DYNAMICALLY CONFIGURED FOR SIMULTANEOUS ACCESSES BY MULTIPLE COMPUTING ENGINES

FIELD OF THE INVENTION

Embodiments of the present invention relate to cache memory devices. In particular, the present invention relates to a method and apparatus for sharing of a cache memory device by multiple computing engines.

BACKGROUND

Computer systems may contain multiple computing engines. For example, an integrated circuit chip may include a Central Processing Unit (CPU) and a graphics processor. The computing engines in a system may share system resources. In the example above, the CPU and the graphics processor may share a system memory device, such as a Random Access Memory (RAM) device. The second computing engine may only need the shared resource at certain times, and thus the resource may be shared dynamically. For example, at some times the CPU may have access to the entire system memory, and at other times (e.g., when the graphics processor is performing a graphics operation), the CPU may share the system memory with the graphics processor. In this example, the system memory may switch during the course of system operation between shared mode and non-shared mode depending on the needs of the graphics processor.

The information (e.g., data and instructions) that a computing engine stores in a RAM may be cached in a cache memory device ("cache"), such as a Static Random Access Memory (SRAM). A cache may have single ported arrays, in which case each bit storage cell in an array only has a single output and single output port (i.e., a single sense amp), or may be multi-ported, in which case each cell in the array has multiple ports. Cache sharing is a technique by which a cache is shared between multiple computing engines, such as a CPU and a graphics processor. In some systems, the cache farthest from the processor core is shared.

One approach to cache sharing is for both computing engines to send requests through the bus controller, such as the CPU's bus controller. This approach requires that the bus be shared, which may possibly affect CPU performance. In addition, this approach is generally inadequate to support multiple simultaneous cache accesses, particularly where the cache is single ported.

DETAILED DESCRIPTION

Embodiments of the present invention relate to methods and apparatus for cache sharing which support simultaneous accesses by multiple computing engines, even where a single ported cache is used. The present invention provides for a single-ported cache that may be dynamically shared by multiple computing engines and may be simultaneously accessed (e.g., read, write) by multiple computing engines. For example, according to embodiments of the present invention, locations in the cache may generally be under the control of a first computing engine, such as a CPU. In this case, the cache is not shared. At some point, a second computing engine, such as a graphics processor, may send a signal to the cache that gives the second computing engine exclusive access to a subdivision of locations (e.g., cache lines) in the cache. Thus, for example, where a graphics application such as a game is being executed by the graphics processor, the cache may be configured so that the cache is shared by both computing engines. In this case, the cache may be said to be in shared mode. The second computing engine may access (e.g., read from or write to) a location within its subdivision of locations at the same time (i.e., simultaneously) as the first computing engine is accessing a location outside this subdivision of locations. In one embodiment, arrays within the cache are subdivided according to ways. In another embodiment, arrays within the cache are subdivided according to sets. In a further embodiment, arrays may be subdivided according to both sets and ways. The present invention may provide for sharing of the cache by any number of computing engines.

Figure 1:
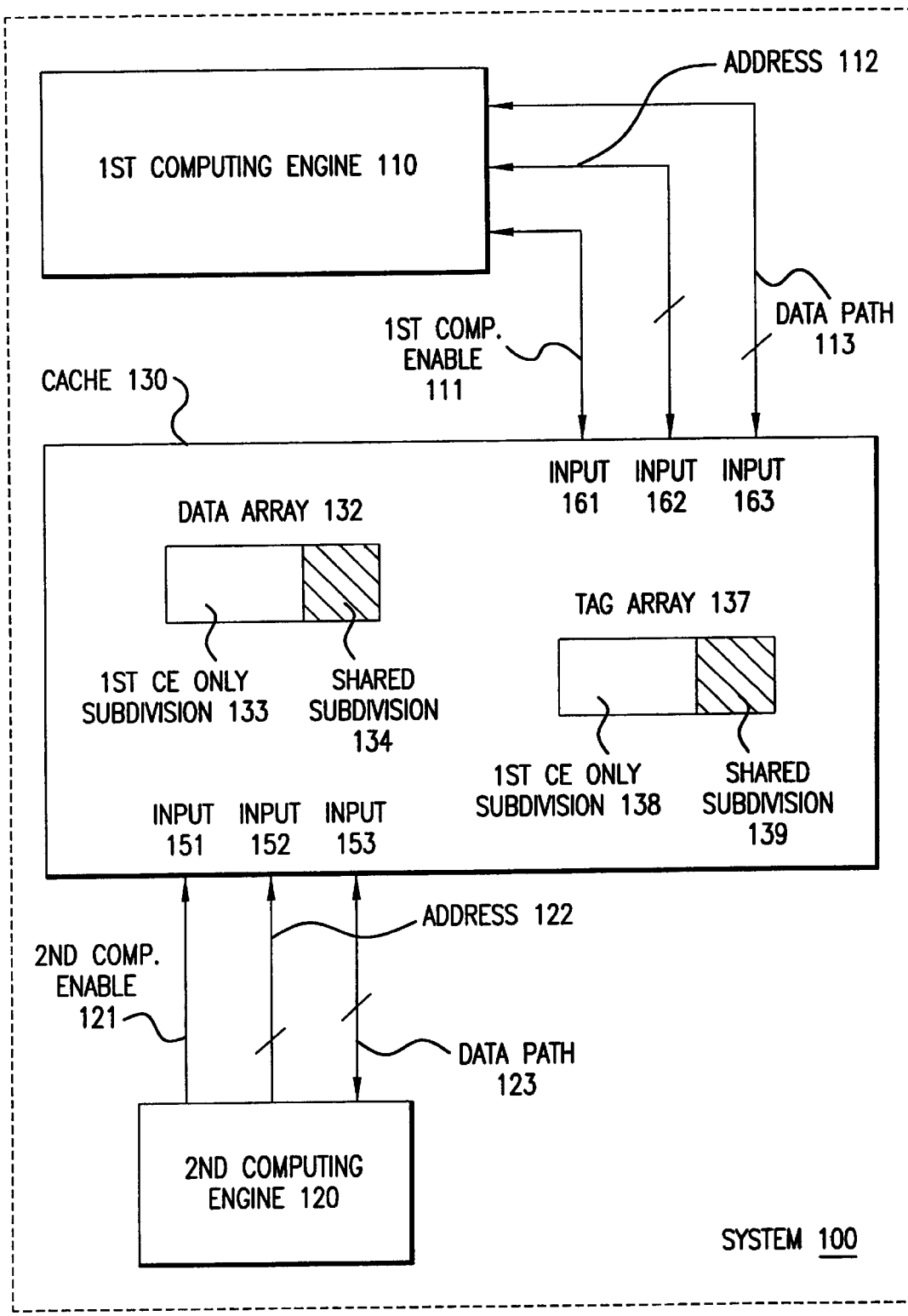
FIG. 1 is a partial block diagram of a computer system having a cache that is dynamically configured for simultaneous access by two computing engines according to an embodiment of the present invention.

FIG. 1 is a partial block diagram of a computer system having a cache that is dynamically configured for simultaneous access by two computing engines according to an embodiment of the present invention. A system 100 contains a first computing engine 110, a second computing engine 120, and a cache 130. System 100 may be an integrated circuit chip. The first and second computing engines may be any type of processors capable of executing instructions, such as for example microprocessors, micro-controllers, or special purpose hardware. For example, the first computing engine 110 may be a CPU and the second computing engine 120 may be a graphics processor. Cache 130 may be an SRAM level 2 (L2) cache for first computing engine 110.

First computing engine 110 may be electrically coupled to cache 130 by a first computing engine enable line 111, an address line 112, and a data path line 113. Two components are electrically coupled if an electrical signal may be transmitted between the two components in at least one direction. The term "electrically coupled" encompasses a direct connection, an indirect connection, or an indirect communication. For example, first computing engine 110 may be electrically coupled to cache 130 through a bus controller. Second computing engine 120 may be electrically coupled to cache 130 by a second computing engine enable line 121, an address line 122, and a data path line 123. In an embodiment, second computing engine 120 may be directly connected to cache 130. Address line 112, address line 122, data path line 113, and data path line 123 may be capable of transmitting multiple bits of information. For example, address line 112 and address line 122 may each be capable of transmitting a 32 bit memory address. First computing engine enable line 111 may be coupled to the cache at input 161, address line 112 may be coupled to the cache at address input 162, and data path line 113 may be coupled the cache at input 163. Second computing engine enable line 111 may be coupled to the cache at input 151, address line 122 may be coupled to the cache at input 152, and data path line 123 may be coupled to the cache at input 153.

Cache 130 may contain a data array 132 and a tag array 137, which may be any type of conventional cache memory arrays that are configured for use in the present invention. Tag array 137 may store tags that are used to identify the location of information stored in data array 132. In addition, cache 130 may also contain other arrays, such as a Least Recently Used (LRU) array and a state array. Arrays in cache 130 may contain a plurality of locations, which may be cache lines arranged into sets and ways as in conventional caching designs. For example, data array 132 may contain 1024 sets and 8 ways, and each location in the array may contain 32 bits of information.

In an embodiment of the present invention, arrays in cache 130 may be divided into subdivisions used for cache sharing. For example, data array 132 may contain a first computing engine only subdivision 133 and a shared subdivision 134, and tag array 137 may contain a first computing engine only subdivision 138 and a shared subdivision 139. These subdivisions may be subdivisions of locations as described below. Additional subdivisions may be used if additional computing engines are to share the cache.

In an embodiment of the present invention, cache 130 may be capable of dynamically changing from a shared mode to a non-shared mode (and vice-versa) using the subdivisions. Such changes may be based on a value (e.g., a flag) received through a shared mode input line such as second computing enable line 121 or first computing enable line 111. When cache 130 is in a non-shared mode, first computing engine 110 may have exclusive access to the locations in cache 130. When cache 130 goes into a shared mode, subdivisions of locations in data array 132 and tag array 137 may be dynamically allocated between the computing engines. When in shared mode, the shared subdivisions (134, 139) of the arrays may be allocated to the second computing engine, while the first computing engine subdivisions (133, 138) continue to be allocated to the first computing engine. The shared subdivisions of the data array 132 and tag array 137 shown in FIG. 1 may be referred to as shared subdivisions because, in embodiments of the present invention, the locations within these subdivisions may be either allocated to the first computing engine (when in non-shared mode) or to the second computing engine (when in shared mode). Thus, these subdivisions are shared on a temporal basis. When allocated to the second computing engine, these subdivisions may be referred to as second computing engine subdivisions. In an embodiment of the invention, first computing engine 110 and second computing engine 120 may both be able to simultaneously cache information (e.g., data and/or instructions) in their respective subdivisions of cache 130 when cache 130 is in a shared mode.

System 100 may operate as follows. This discussion assumes, for the sake of example, that the first computing engine is a CPU and the second computing engine is a graphics processor. At a first time, cache 130 may be in non-shared mode and the CPU may have exclusive access to the locations in cache 130. In this case, the CPU may be able to store data in, or read data from, any location in cache 130. Thus, the second computing engine may be unable to access cache 130. When the CPU wishes to read a location in cache 130, for example, it may assert the first computing engine enable line 111 and transmit an address on address line 112. The data stored for the location addressed may be transmitted back to the CPU over data path 113.

During the operation of system 100, the graphics processor may need to cache data, for example when it begins to execute a graphics application such as a game. In this case, the graphics processor may assert second computing engine enable line 121, thus sending a shared mode selection value on this line. In this embodiment, second computing engine enable line 121 may be a shared mode input to cache 130. When cache 130 receives a shared mode value on second computing engine enable line 121, it may go into shared mode. In this case, data array 132 and tag array 137 (and other arrays in cache 130) may be subdivided into a first computing engine subdivision (133, 138) and a second computing engine subdivision (134, 139). At this time, information that was currently stored in the first computing engine subdivision may remain for use by the CPU while in shared mode. Information currently stored in the second computing engine subdivision must be flushed and written back to main memory, because this information was used by the CPU and these subdivisions will now be controlled by the graphics processor. The graphics processor may then access a location by sending an address over address line 122, and data may be transmitted over data path 123. In this embodiment of a shared mode, the graphics processor may have exclusive access (e.g., read, write) to the locations in the second computing engine subdivisions of the cache arrays, and the CPU may have exclusive access to the locations that are in the first computing engine subdivisions. The second computing engine subdivision may be referred to as "locked" when the second computing engine has exclusive access to this subdivision, in which case the other computing engines cannot use the subdivision until it is released back. According to an embodiment, when the cache is shared, multiple computing engines may access the cache simultaneously.

The graphics processor's need for a cache may end at some later time, for example when a graphics application terminates. In this case, cache 130 may be dynamically returned to non-shared mode by de-asserting the second computing engine enable line 121. When this non-shared mode value is received by cache 130, the second computing engine subdivision is flushed and control over this subdivision is given back to the CPU. In this embodiment, cache 130 may be dynamically changed back from shared mode to non-shared mode any number of times during the operation of system 100, and for intervals of any duration, based upon the needs of the second computing engine 120.

In a further embodiment, cache 130 may be shared by three or more computing engines. In this embodiment, the cache arrays may be subdivided into a first computing engine only subdivision, a second computing engine subdivision, a third computing engine subdivision, etc. In one embodiment, the first computing engine is a CPU, the second computing engine is a graphics processor, and the third computing engine is a digital signal processor. In an embodiment, the subdivisions do not overlap, and the cache may contain any combination of second computing engine subdivisions at any time. In one embodiment where the CPU is the first computing engine, the CPU always has exclusive control over at least one subdivision. In this embodiment, for example, the CPU may share the cache with the second computing engine for one time interval, with the third computing engines at another time interval, and with both the second and third computing engines for a third time interval.

Figure 2:
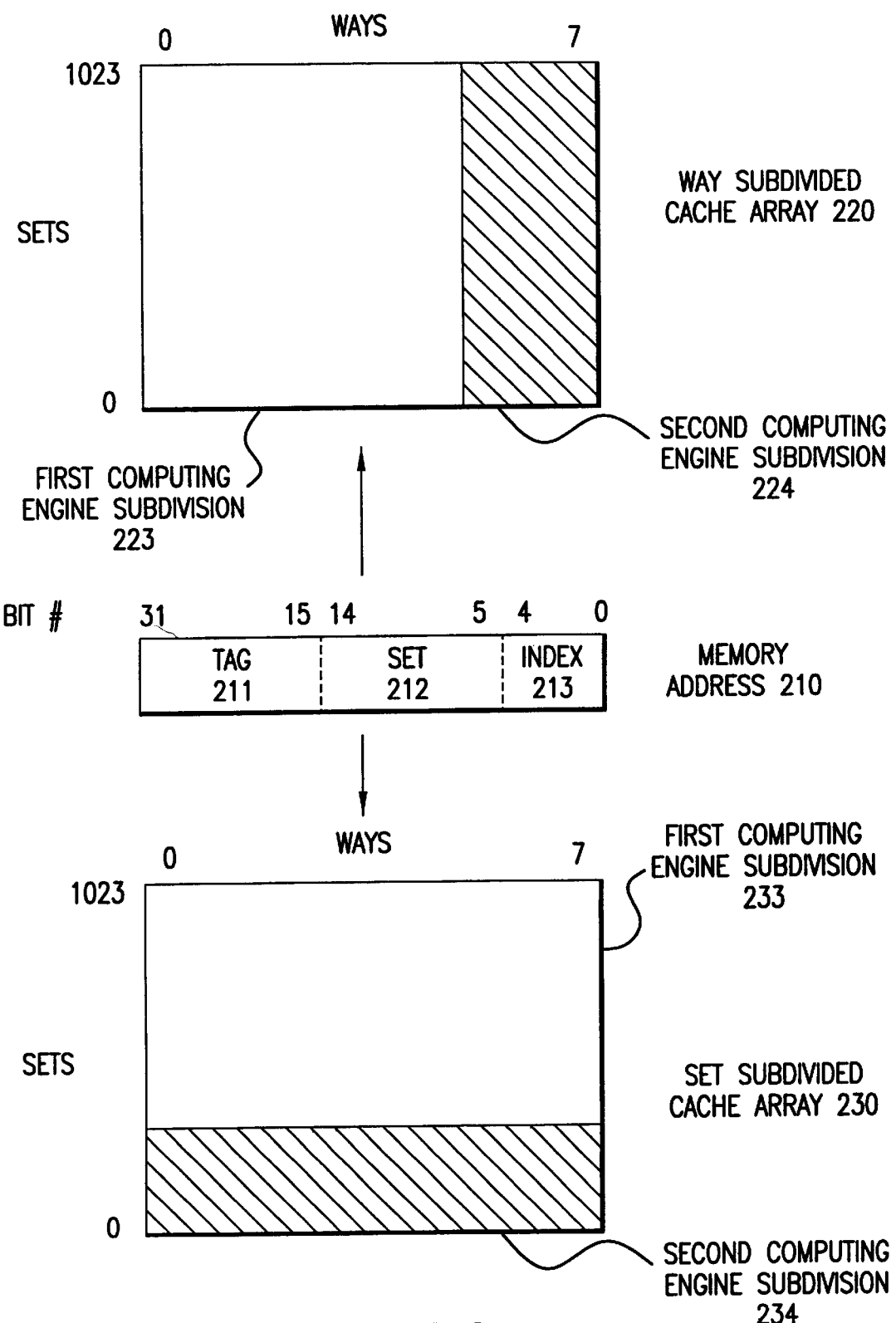
FIG. 2 is a partial block diagram of a memory address, a way subdivided cache array, and a set subdivided cache array according to embodiments of the present invention.

FIG. 2 is a partial block diagram of memory address 210, a way subdivided cache array 220, and a set subdivided cache array 230 according to embodiments of the present invention. Memory address 210 may be an address that is transmitted on address line 112 or address line 122 when the respective computing engine needs to access the memory location specified by the address. In the embodiment shown in FIG. 2, memory address 210 is a 32 bit memory address. Memory address 210 may be an address of a location in a system memory (e.g., RAM) that may be translated into a cache memory address as shown in FIG. 2. According to this embodiment, memory address 210 may be subdivided into an index field 213, a set field 212, and a tag field 211. Of course, the sizes of the fields may be varied based on the structure of the cache arrays. According to conventional caching techniques, the set portion of the memory address may identify a set in each of the cache arrays. The tag portion may be matched, against tags stored in that set of the tag array, to determine which way the information is stored in (if there is a cache hit). The index portion may index the cache line.

The way subdivided cache array 220 and the set subdivided cache array 230 shown in FIG. 2 represent cache arrays as they may be subdivided according to two different embodiments of the present invention. Array 220 and array 230 may be any array of a cache such as cache 130 of FIG. 1 (e.g., a set array, tag array, LRU array, etc.). In one embodiment, the LRU array keeps track of the least recently used set in each subdivision. In FIG. 2, the cache arrays 220 and 230 each have, for example, 1024 sets and 8 ways. Of course, other arrangements may be used.

According to one embodiment, the arrays in the cache are divided according to way subdivision. This embodiment is illustrated by way subdivided cache array 220. In this embodiment, when in shared mode, each computing engine may be allocated a plurality of ways in a cache array. For example, the array may be divided into a first computing engine subdivision 223 and a second computing engine subdivision 224. In an embodiment, first computing engine subdivision 223 may contain ways 0–5, and a second computing engine subdivision 224 may contain ways 6–7. Of course, other sized subdivisions may also be used. According to this embodiment, when in shared mode, the first computing engine has exclusive access to the ways in first computing engine subdivision 223, and the second computing engine has exclusive access to the ways in second computing engine subdivision 224.

According to another embodiment, the arrays in the cache are divided according to set subdivision. This embodiment is illustrated by set subdivided cache array 230. In this embodiment, when in shared mode, each computing engine may be allocated a plurality of sets in each cache array. For example, the array may be divided into a first computing engine subdivision 233 and a second computing engine subdivision 234. In an embodiment, first computing engine subdivision 233 may contain sets 768–1023, and a second computing engine subdivision 224 may contain sets 0–767. Of course, other sized subdivisions may also be used. According to this embodiment, when in shared mode, the first computing engine has exclusive access to the sets in first computing engine subdivision 233, and the second computing engine has exclusive access to the sets in second computing engine subdivision 234.

The relative size of the set subdivisions is variable, as is the relative size of the ways subdivisions. In an embodiment where the first computing engine is a CPU, the first computing engine subdivision size may be larger than the second computing engine subdivision size. In a further embodiment, where more than two computing engines share the cache, the cache arrays may be divided into multiple way subdivisions or multiple set subdivisions. For example, in a way subdivided embodiment in which a cache is shared by a CPU, graphics engine, and digital signal processor, the ways 0–3 may be allocated to the CPU, ways 4–5 may be allocated to the graphics engine, and ways 6–7 may be allocated to the digital signal processor. In a further embodiment, the cache may be divided using a combination of both set subdivision and way subdivision. For example, the second computing engine may be allocated ways 6–7 of sets 512–1023.

Figure 3:
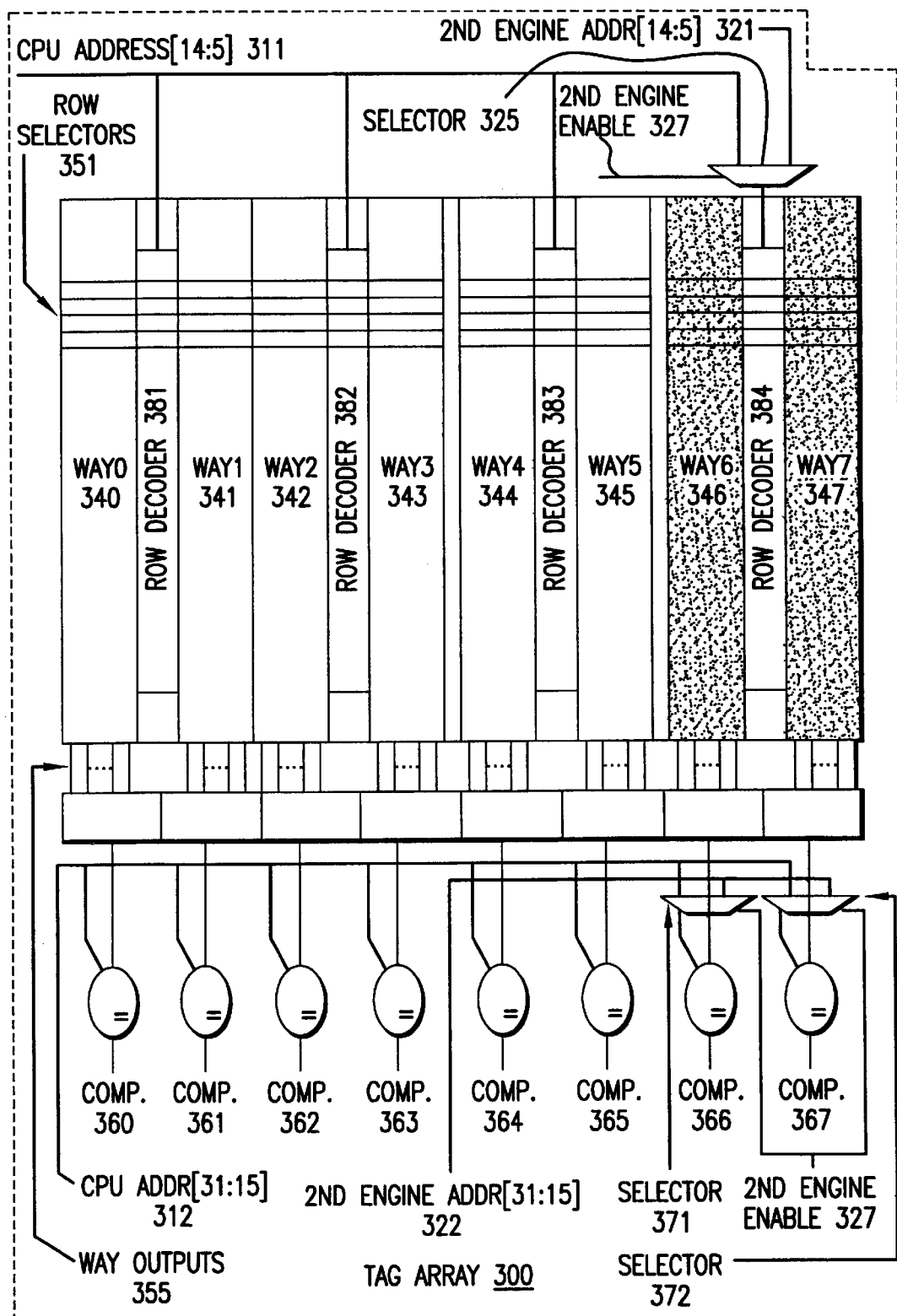
FIG. 3 is a partial block diagram of a cache tag array configured for dynamic way subdivision according to an embodiment of the present invention.

FIG. 3 is a partial block diagram of a cache tag array configured for dynamic way subdivision according to an embodiment of the present invention. Tag array 300 contains a plurality of ways (way0 340 to way7 347). In this embodiment, way0 to way5 may represent the first computing engine only subdivision (shown as 138 of FIG. 1 and 223 of FIG. 2). Way6 and way7 may represent the shared subdivision (shown as 139 of FIG. 1 and 224 of FIG. 2).

The respective way outputs 355 are electrically coupled to a plurality of comparators (comparator 360 to comparator 367). Each of the 8 ways are divided into a plurality of rows and are associated with a row decoder (381 to 384) and with row selectors 351. There may be, for example, 1024 rows in each way. In the embodiment shown, the ways are divided into four equal block instantiations. The array is two-way interleaved, and each pair of ways share a row decoder. Each row in each way may contain a tag and may contain attribute bits. Each row may be, for example, 17 bits in length. Of course, the tag array may have a different number of ways and rows and may store different size tags. Tag array 300 also contains a selector 325, a selector 371, and a selector 372. These selectors may be any components capable of selecting between multiple inputs, based on a third input, and outputting the input selected. In another embodiment, the selector may be a component capable of receiving an input and choosing one or two outputs based on a second input. For example, the selectors may be multiplexors or may be tri-states.

In this embodiment, the inputs to tag array 300 may include portions of a CPU address (311, 312), portions of a second computing engine address (321, 322), and a second computing engine cache enable line 327. As is discussed below, portions of the addresses are input to respective selectors, and the second computing engine cache enable line 327 is used to select between these inputs.

In the embodiment shown in FIG. 3, the CPU corresponds to the first computing engine of FIG. 1 In another embodiment, a different computing engine may be used instead of a CPU. The CPU address may be input into components of tag array 300 as CPU address[14:5] 311, which represents bits 14:5 of the CPU address, and CPU address[31:15] 312, which represents bits 31:15 of the CPU address. The CPU address may be, for example, in the form of memory address 210 of FIG. 2. In this case, CPU address[14:5] 311 corresponds to the set portion of the memory address (i.e., set 212) and CPU address[31:15] 312 corresponds to the tag portion of the memory address (i.e., tag 211). Similarly, the second computing engine address may be input into components of tag array 300 as second computing engine address[14:5] 321, which represents bits 14:5 of the second computing engine address, and second computing engine address[31:15] 322, which represents bits 31:15 of the second computing engine address. The second computing engine address may also be in the form of memory address 210 of FIG. 2. In this case, second computing engine address[14:5] 321 corresponds to the set portion of the address and second computing engine address [31:15] 322 corresponds to the tag portion of the address.

The inputs to selector 325 are CPU address[14:5] 311, and second computing engine address[14:5] 321. Thus, the inputs to selector 325 are the set portions of the CPU and second computing engine addresses. The output of selector 325 is an input to row decoder 384. The inputs to selectors 371 and 372 are CPU address[31:15] 312 and second computing engine address[31:15] 322. Thus, the inputs to selector 325 are the tag portions of the CPU and second computing engine addresses. The outputs of selectors 371 and 372 are inputs to comparitors 366 and 367, respectively. In a further embodiment, the input to selector 325 may be the output of another selector that itself selects between multiple computing engines.

The embodiment of a way subdivided tag array shown in FIG. 3 may operate as follows. In both shared mode and non-shared mode, the CPU sends an address to the cache, and the set portion of the address (CPU address[14:5] 311) is sent to row decoders 381 to 383. The row decoders select the corresponding sets in ways 0–5, causing the tags stored at these locations to be input to comparators 360–365 respectively. The tag portion of the CPU address (CPU address[31:15] 312) is also input to comparators 360–365. If any of these the tags read out of any of the ways matches the tag portion of the CPU address, then a hit for that way has been detected and the respective comparator for the matching way may output a hit signal.

In non-shared mode, the CPU has exclusive access to all of the ways in tag array 300, including way6 and way7. The selector 325, selector 371, and selector 372 will each receive a non-shared mode value from second computing engine enable line 327 when in the non-shared mode. Thus, selector 325 selects the set portion of the CPU address (CPU address[14:5] 311) and inputs this set designation into row decoder 384. This row decoder selects the corresponding sets in ways 6 and 7, causing the tags stored at these locations to be input to comparators 366 and 367, respectively. Selector 371 and selector 372 will select the tag portion of the CPU address (CPU address[31:15] 312) and input this value to comparators 366 and 367, respectively. If the tags read out of way6 or way7 matches the tag portion of the CPU address, then a hit for that way has been detected and the respective comparator for the matching way may output a hit signal.

When in shared mode, the second computing engine has exclusive access to way6 and way7. The selector 325, selector 371, and selector 372 will each receive a shared mode value from second computing engine enable line 327 when in the shared mode. Thus, selector 325 selects the set portion of the second computing engine address (second computing engine address[14:5] 321) and inputs this set designation into row decoder 384. This row decoder selects the corresponding sets in way6 and way7, causing the tags stored at these locations to be input to comparators 366 and 367, respectively. Selector 371 and selector 372 will select the tag portion of the second computing engine address (second computing engine address[31:15] 322) and input this value to comparators 366 and 367, respectively. If the tags read out of way6 or way7 matches the tag portion of the second computing engine address, then a hit for that way has been detected and the respective comparator for the matching way may output a hit signal. When in shared mode, the outputs of the comparators for the non-shared ways are used to determine a CPU hit or miss, and the outputs of the comparators for the shared ways are used to determine a second computing engine hit/miss.

Figure 4:
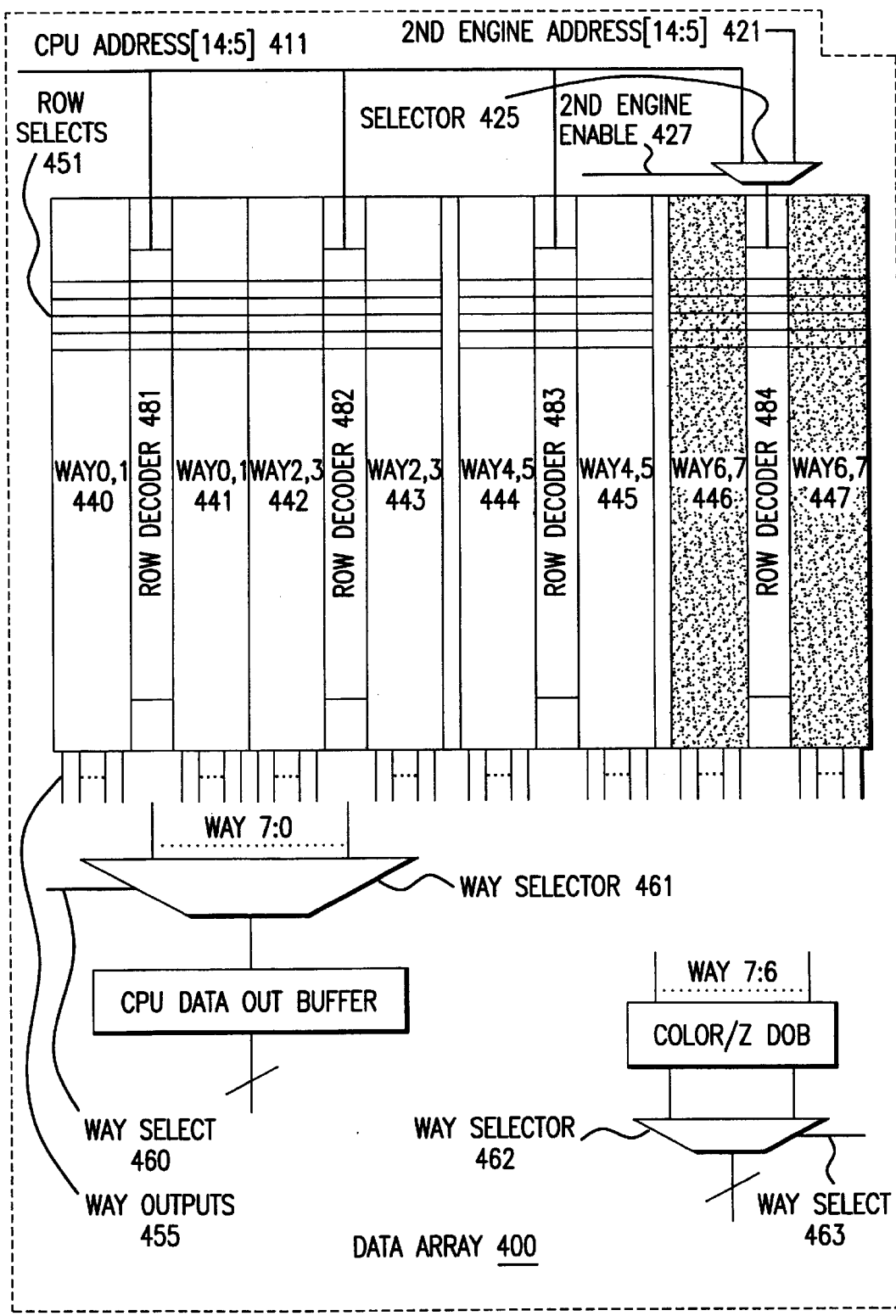
FIG. 4 is a partial block diagram of a cache data array configured for dynamic way subdivision according to an embodiment of the present invention.

FIG. 4 is a partial block diagram of a cache data array configured for dynamic way subdivision according to an embodiment of the present invention. Data array 400 of FIG. 4 may be accessed by using the way that was selected using tag array 300 of FIG. 3. Similar to FIG. 3, in FIG. 4 the data array 400 contains a plurality of ways (way0 440 to way7 447), which are interleaved. In this embodiment, ways 0 to 5 may represent the first computing engine only subdivision, and ways 6 to 7 may represent the shared subdivision. Each of the 8 ways are divided into a plurality of rows and is associated with a row decoder (481 to 484) and with row selectors 451. There may be, for example, 1024 rows in each way. Each row in each way may contain a cache line which may be, for example, 32 bytes in length. Of course, the data array may have a different number of ways and rows and may store a different size cache line. Data array 400 also contains a selector 425, a way selector 461, and a way selector 462.

The inputs to data array 400 may include: the set portions of a CPU address (411), the set portion of a second computing engine address (421), a second computing engine cache enable line 427, a way select 460, and a way selector 461. As with FIG. 3, in other embodiments the address for a different computing engine may be used instead of the CPU address. In the embodiment shown in FIG. 3, the set portions of the addresses and the enable lines may all be inputs to selector 425, and this selector may feed its output to ways 6 and 7. In addition, the set portion of the CPU address (411) may be input to ways 0 to 5. The way outputs 455 of ways 0 to 7 way may be electrically coupled to a way selector 461. In addition, the way outputs for ways 6 and 7 may be output to a way selector 462.

The embodiment of a way subdivided data array shown in FIG. 4 may operate as follows. In both shared mode and non-shared mode, the CPU sends an address to the cache, and the set portion of the address (CPU address[14:5] 411) is sent to row decoders 481 to 483. In shared mode, the row decoders select the corresponding sets in ways 0–5, causing the data stored at these locations to be input to way selector 461. In non-shared mode, the selector 425 will receive a non-shared mode value from second computing engine enable line 427, and the CPU has exclusive access to all of the ways in data array 400, including ways 6 and 7. In this case, selector 425 selects the set portion of the CPU address (CPU address[14:5] 411) and inputs this set designation into row decoder 484. This row decoder selects the corresponding sets in ways 6 and 7, causing the data stored at these locations to be input to way selector 461 and way selector 462. The matching way that was earlier chosen by the tag array (e.g., tag array 300) is a selector input to way selector 461. Thus, in shared mode, if there was a cache hit in the tag array, the cache line corresponding to the set address and the matching way will be output by way selector 461. This information may be sent to a CPU data output buffer.

When in shared mode, the second computing engine has exclusive access to ways 6 and 7. The selector 425 will receive a shared mode value from second computing engine enable line 427 when in the shared mode. Thus, selector 425 selects the set portion of the second computing engine address (second computing engine address[14:5] 421) and inputs this set designation into row decoder 484. This row decoder selects the corresponding sets in ways 6 and 7, causing the cache lines stored at these locations to be input to way selector 462. The matching way that was chosen earlier by the tag array (e.g., tag array 300) is a selector input to way select 462. Thus, in shared mode, if there was a cache hit in the tag array, the cache line corresponding to the set address and the matching way will be output by way selector 462. This information may be sent to a data output buffer for the second computing engine. Independent busses may be used to route the data to the individual computing engines.

Thus, according to an embodiment that uses way subdivision, the CPU has exclusive access to way6 and way7 of the tag array 300 and the data array 400 when the input on second computing engine enable line is for non-shared mode. In this embodiment, the second computing engine has exclusive access to these subdivisions when the input on second computing engine enable line is for shared mode. In this case, way6 and way7 are the shared subdivisions.

Data may be read from a shared cache when the cache receives a mode selection value signifying that the cache is in shared mode, receives a first addressing value at a first address input, and selects the first addressing value at a first selector component based upon the received mode selection value. The first addressing value may be used to identify a location in a cache data array, and the data may be read from the location. Data may be read by another computing engine from another subdivision in the cache. In this case, the cache may receive a second addressing value at a second address input, identify a second location in the cache data array using the second addressing value, and read data from the second location simultaneously with said reading data from the first location. In another case, the cache may switch into non-shared mode, and the first computing engine may read data from the same location that the second computing engine read data from. The cache may receive a mode selection value signifying that the cache is not in shared mode, receive a second addressing value at a second address input, and select the second addressing value at the first selector component based upon the mode selection value that signifies that the cache is not in shared mode. The cache may then use the second addressing value to identify said first location as the location to be read, and may read data from the location to be read. This second case may include flushing the cache after switching modes, and the first computing engine storing new data in the location to be read.

In a further embodiment, the tag array 300 and data array 400 may contain additional subdivisions for one or more additional computing engines. In this further embodiment, an additional set of selectors (i.e., corresponding to selectors 325, 371 and 372) may be configured to control access to other ways, such as for example way4 and way5. In this embodiment, the additional set of selectors may receive as inputs the CPU address portions, third computing engine portions, and a third computing engine enable signal. In an embodiment, the cache indexes information within the individual cache lines.

Figure 5:
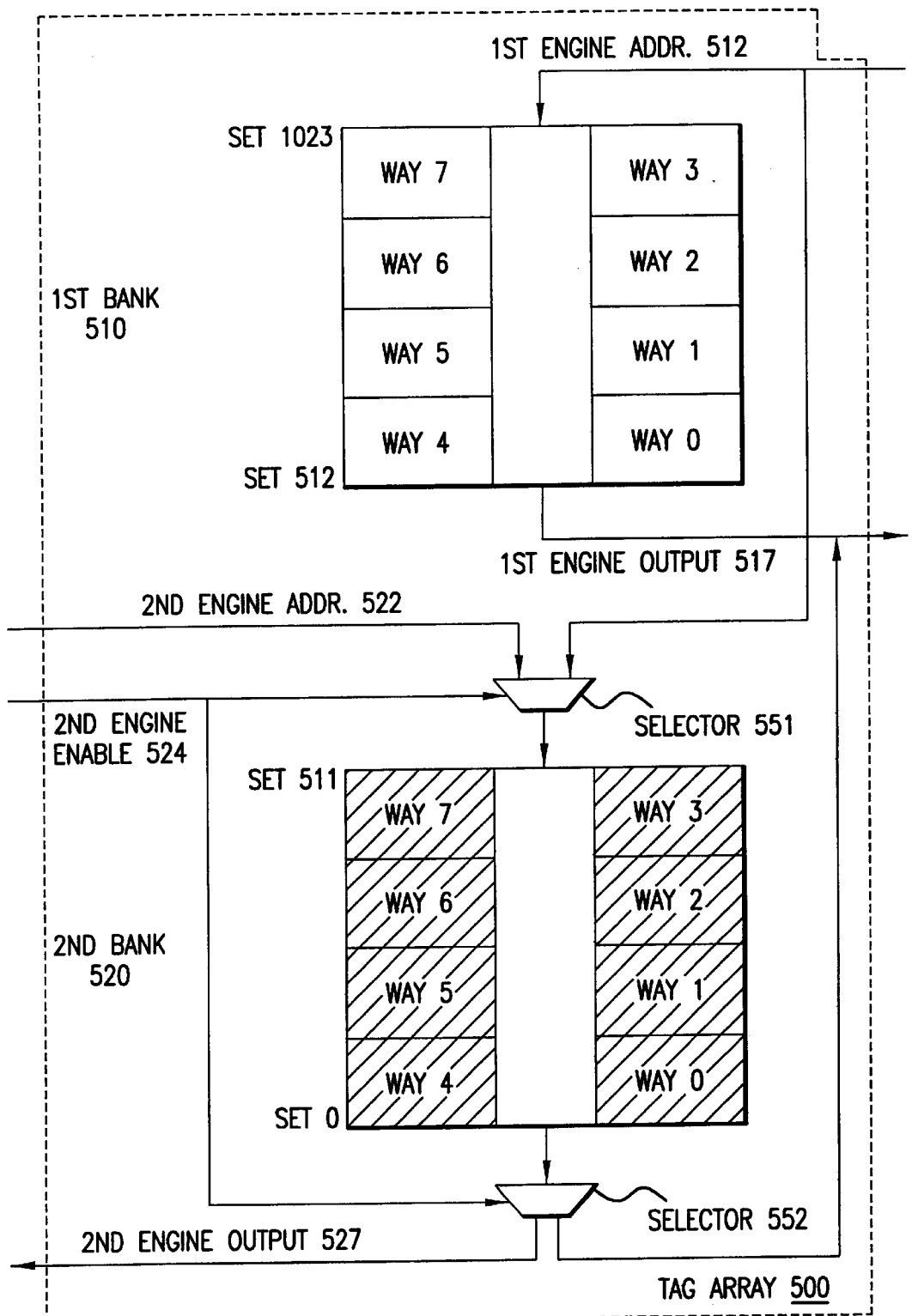
FIG. 5 is a partial block diagram of a cache tag array configured for dynamic set subdivision according to an embodiment of the present invention.

FIG. 5 is a partial block diagram of a cache tag array 500 configured for dynamic set subdivision according to an embodiment of the present invention. The tag array may be divided into two banks which each contains half the sets and all eight ways. In this embodiment, the cache has 1024 sets, and the cache may be shared in equal subdivisions by a first computing engine and a second computing engine. In other embodiments, the cache may contain a different number of banks, sets or ways, and the relative size of the subdivisions may be varied.

Tag array 500 may have a first bank 510 that contains sets 512 to 1023, and a second bank 520 that contains sets 0 to 511. The first bank 510 may represent the first computing engine only subdivision (shown as 138 of FIG. 1 and 234 of FIG. 2) and the second bank 520 may represent the shared subdivision (shown as 139 of FIG. 1 and 234 of FIG. 2). In this embodiment, first engine address 512 may contain a portion of a memory address provided to the cache by the first computing engine, and second engine address 522 may contain a portion of a memory address provided to the cache by the second computing engine. For example, first engine address 512 may contain the tag portion and set portion of the first computing engine's memory address, and second engine address 522 may contain the tag portion and set portion of the second computing engine's memory address. The first engine address 512 and second engine address 522 may be split into set and tag portions within first bank 510 and second bank 520 for use as discussed with reference to FIG. 3.

Tag array 500 may also include a selector 551 and selector 552. The inputs to selector 551 may be first engine address 512 and second engine address 522, and second engine enable 524. Selector 551 may provide its output to second bank 520. Selector 552 may receive as inputs second enable 524 and the output of second bank 520. Selector 552 may have first engine output 517 and second engine output 527 as outputs.

In this embodiment, the first computing engine has exclusive control of the first bank 510 regardless of whether the cache is in shared or non-shared mode. Thus, the first computing engine may access any way of sets 512–1023 by providing an address on first engine address 512 and receiving an output on first engine output 517. When not in shared mode, the first computing engine also has exclusive access to second bank 520. In this mode, the second engine enable 524 has a non-shared value. Thus, selector 511 may output the first engine address 512 to the second bank 520, and selector 527 may provide the output of second bank 520 to first engine output 517. When in shared mode, the second computing engine has exclusive access to second bank 520. In this mode, the second engine enable 524 has a shared value. Thus, selector 511 may output the second engine address 522 to the second bank 520, and selector 527 may provide the output of second bank 520 to second engine output 527. Tag array 500 also may have a selector coupled to the first and second engine via a data path and coupled to the data input of second bank 520 for selecting a data input to that bank. This selector may operate in a manner similar to selector 551. This may require additional I/O busses.

In an embodiment that uses set subdivision, a cache data array may be configured similar to the cache tag array of FIG. 5. The row decoders for the banks in the first computing engine only subdivision receive the set address for the first computing engine. When in non-shared mode, the row decoders for the banks in the shared subdivision also receive the set address for the first computing engine. When in shared mode, the row decoders for the banks in the shared subdivision receive the set address for the second computing engine. The data outputs and inputs for the banks may be configured similarly. In a further embodiment, the cache may be set subdivided into three subdivisions for access by three computing engines.

In embodiments of the set subdivided cache, the most significant bit of the set address is not used to identify a set in the arrays. For example, if the array has 1023 sets, and the set portion of the address uses bits 5 to 14 (as shown in FIG. 2), then the cache may use only bits 5 to 13 to identify a set. In this case, the second computing engine only has access to sets 0 to 511, and thus the 9 bit set address uniquely identifies one of those sets. In non-shared mode, however, the 9 bit set address may identify two different sets in the array. In this embodiment, the most significant bit (e.g., bit 14) may be saved in the tag array and used as part of the tag when identifying a way.

Figure 6:
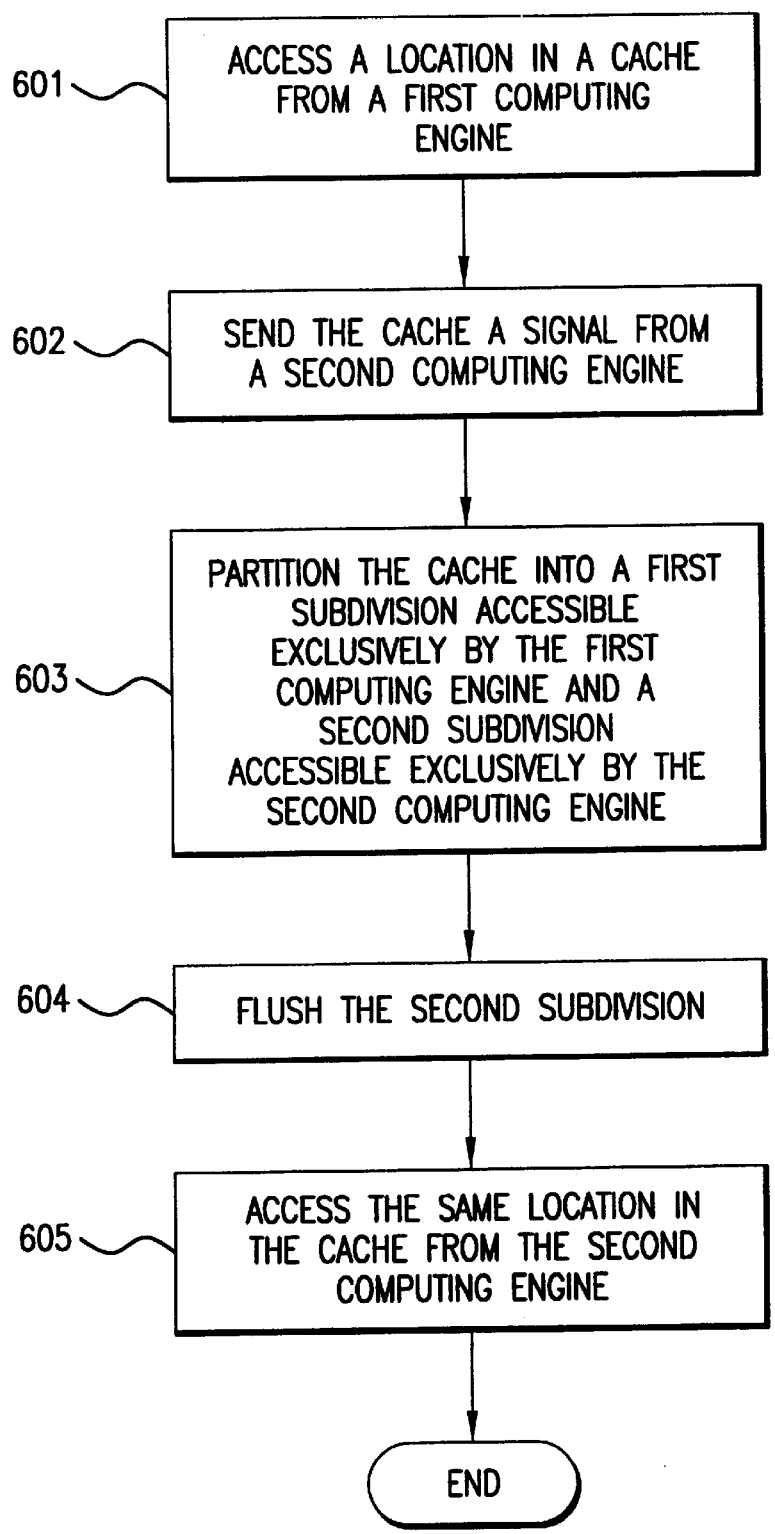
FIG. 6 is a flow chart that shows a method of cache sharing according to an embodiment of the present invention.

FIG. 6 is a flow chart that shows a method of cache sharing according to an embodiment of the present invention. The cache may be shared by a first computing engine and second computing engine such as those shown in FIG. 1. According to this embodiment, the first computing engine may access a location in the cache (601). At this time, the cache may be in non-shared mode. For example, the first computing engine may read information stored at the first way in the third set of a data array in the cache. A signal associated with cache sharing may then be sent to the cache (602). For example, the second computing engine may assert its cache enable signal. The cache may be partitioned into a first subdivision accessible exclusively by the first computing engine and a second subdivision accessible exclusively by the second computing engine (603). In one embodiment, arrays (e.g., a data array and a tag array) in the cache may be partitioned into a plurality of ways. In a second embodiment, arrays in the cache may be partitioned into a plurality of sets. The second subdivision may be flushed (604). The first computing engine may have stored information in the second subdivision, because the cache had been in non-shared mode, and flushing the cache may be used to safely write the data back to the main memory. The same location that was earlier accessed by the first computing engine may now be accessed by the second computing engine (605). Continuing with the example described above, the second computing engine may store data in the first way in the third set of the data array.

Figure 7:
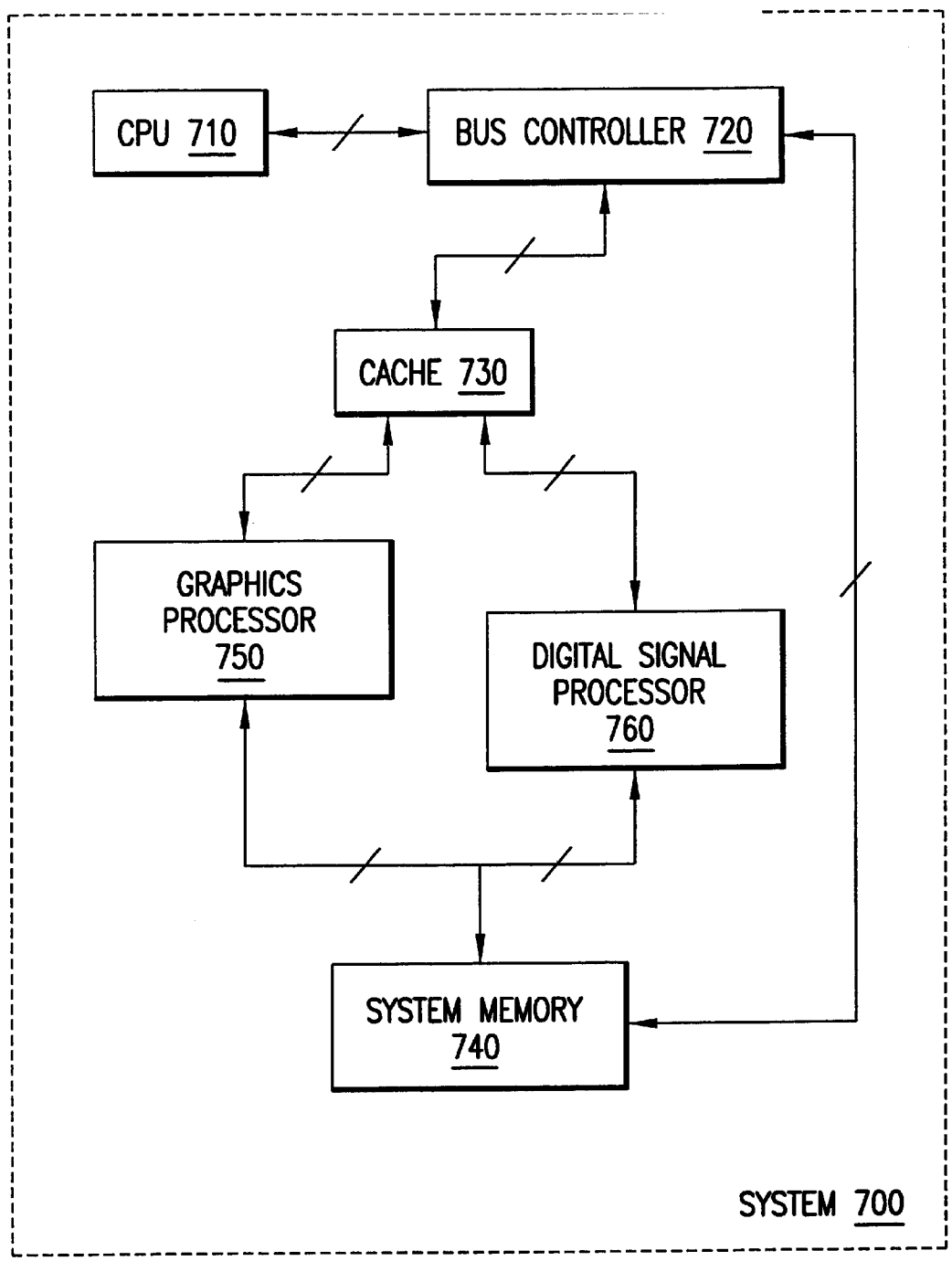
FIG. 7 is a partial block diagram of a computer system having a cache that is dynamically configured for simultaneous access by a CPU, graphics processor, and digital signal processor according to an embodiment of the present invention.

FIG. 7 is a partial block diagram of a computer system 700 having a cache that is dynamically configured for simultaneous access by a CPU, graphics processor, and digital signal processor according to an embodiment of the present invention. System 700 includes a CPU 710 that is coupled to a bus controller 720. The bus controller is coupled to a cache 730 and a system memory 740. A graphics processor 750 and a digital signal processor 760 are coupled to the cache 730. In addition, the graphics processor 750 and digital signal processor 760 are coupled to system memory 740. The graphics processor 750 may compute the texture attribute, the color (e.g., RGB), and the depth (z) for a graphics application. The digital signal processor 760 may process digital signals.

CPU 710, graphics processor 750, and digital signal processor 760 may share cache 730 using dynamic subdivision as described above. In this embodiment, an L2 only graphics cache is not needed. In an embodiment, whenever the mode is changed (e.g., one of the graphics processor begins to share the cache or stops sharing the cache), then the cache is flushed into system memory 740. In an embodiment, all three computing engines have different read/write paths to the system memory. In a further embodiment, different flush paths are used for all three computing engines. This embodiment avoids contention which could otherwise occur if two computing engines attempted to flush at the same time or read/write while the other is flushing.

The present invention relates to methods and apparatus for cache sharing which support simultaneous accesses by multiple computing engines directly to a cache array. Because a single ported cache may be used, the present invention does not require changes to the design of the cache cells. Embodiments of the present invention provide direct approach to cache sharing in that one or more computing engines are able to access the cache directly without going through a common bus controller. Subdivisions of the cache act as "virtual ported caches." The virtual caches may be different in size depending upon the sharing configuration mode. According to an embodiment of the present invention, the cache subdivisions are transparent to the computing engines.

The present invention may be implemented as a way subdivided, a set subdivided ache, or a combination of both. The set subdivided implementation provides for a greatly reduced die size and timing impact in some cache implementations. Using set subdivision also has a different effect on way-associativity. When using set subdivision, in a n-way associative cache, the default for all shared request types is n-way set associativity. When using way subdivision, by default, an n-way set associative cache splits all n-ways among all shared request types. In an embodiment, the data, tag and state arrays need a minimum of n row decoders and n I/O's to enable n-simultaneous cache accesses. This is also the case for a set subdivided LRU array. For a way subdivided cache array, however, if any of the request types is direct mapped, no LRU mechanism is needed for such way in shared mode.

Several embodiments of the present invention are specifically illustrated and/or described herein. However, it will be appreciated that modifications and variations of the present invention are covered by the above teachings and within the purview of the appended claims without departing from the spirit and intended scope of the invention. For example, any number of computing engines may share the cache, arid the cache may have any configuration (e.g., banks, ways, sets and lines). As another example, although embodiments discussed above use the second computing engine enable line to enable/disable shared mode, in other embodiments other inputs to the cache may be used. In one such embodiment, the second computing engine sends a signal to first computing engine whenever the second computing engine wants to share the cache (or no longer needs to share the cache), and the first computing engine asserts/deasserts the first computing engine enable line to activate/deactivate shared mode. Further, while the embodiments disclosed above discuss reading from the dynamically shared cache, the same mechanisms may be used to control writing from the dynamically shared cache. As another example, the steps in the method may be varied as appropriate. Further, there may be additional connections between the cache and the computing engines (e.g., control lines).

We claim:

1. A cache, comprising:

a tag array comprising a first address input to receive an address from a first computing engine, a second address input to receive an address from a second computing engine, a shared mode input to receive a shared mode value, and a plurality of tag array lines arranged into a plurality of sets and ways, wherein a first subdivision of said sets of tag array lines in each of said ways may be dynamically allocated either for exclusive access by the first computing engine or for exclusive access by the second computing engine, wherein said allocation is based upon the shared mode value received at the shared mode input, wherein the plurality of sets of tag array lines in the tag array also includes a second subdivision of said sets, and wherein sets of tag array lines in the second subdivision are allocated for exclusive access by the first computing engine regardless of the shared mode value received at the shared mode input; and a data array electrically coupled to the tag array.

2. The cache of claim 1, wherein the plurality of tag array lines in the first subdivision are in a first bank of sets and the plurality of tag array lines in the second subdivision are in a second bank of sets.

3. The cache of claim 1, wherein the tag array further comprises a row decoder to select a set of tag array lines in the first subdivision, wherein the first address input, second address input, and shared mode input are coupled to a selector, and wherein said row decoder is coupled to said selector to receive an address for either the first computing engine or the second computing engine depending upon the value received at the shared mode input.

4. The cache of claim 1, wherein the data array comprises a plurality of sets of data array lines, wherein a first subdivision of said sets of data array lines may be dynamically allocated either for exclusive access by the first computing engine or for exclusive access by the second computing engine.

5. The cache of claim 4, wherein the plurality of sets of data array lines also includes a second subdivision of said sets, and wherein sets in said second subdivision of data array lines are allocated for exclusive access by the first computing engine regardless of the shared mode value received at the shared mode input.

6. The cache of claim 1, wherein the first address input receives an address that comprises a plurality of bits, wherein said plurality of bits include a set field and a tag field, wherein said set field includes a first bit, and wherein the tag array contains a row decoder and a selector to select a set in the tag array based on the address received at the first address input without using said first bit in the set field of said received address.

7. The cache of claim 6, wherein the tag array contains logic to identify a way in the cache based in part upon said first bit in the set field of the address received at the first address input.

8. The cache of claim 1, wherein the shared mode input in the tag array is to receive a cache enable signal from the second computing engine.

9. The cache of claim 1, wherein the cache contains logic to flush the first subdivision of tag array lines if a different value is received at the shared mode input.

10. A system comprising:
a first computing engine;
a second computing engine; and
a cache comprising:
a tag array comprising a first address input to receive an address from the first computing engine, a second address input to receive an address from the second computing engine, a shared mode input to receive a shared mode value, and a plurality of tag array lines arranged into sets and ways, wherein a first subdivision of said sets of tag array lines in each of said ways may be dynamically allocated either for exclusive access by the first computing engine or for exclusive access by the second computing engine, and wherein said allocation is based upon the shared mode value received at the shared mode input, wherein the plurality of sets of tag array lines in the tag array also includes a second subdivision of said sets, and wherein sets of tag array lines in the second subdivision are allocated for exclusive access by the first computing engine regardless of the shared mode value received at the shared mode input; and
a data array electrically coupled to the tag array.

11. The system of claim 10, wherein the plurality of tag array lines in the first subdivision are in a first bank of sets and the plurality of tag array lines in the second subdivision are in a second bank of sets.

12. The system of claim 11, wherein the tag array further comprises a row decoder to select a set of tag array lines in the first subdivision, wherein the first address input, second address input, and shared mode input are coupled to a selector, and wherein said row decoder is coupled to said selector to receive an address for either the first computing engine or the second computing engine depending upon the value received at the shared mode input.

13. The system of claim 12, wherein the data array comprises a plurality of sets of data array lines, wherein a first subdivision of said sets of data array lines may be dynamically allocated either for exclusive access by the first computing engine or for exclusive access by the second computing engine.

14. The system of claim 10, wherein the first address input is to receive an address that comprises a plurality of bits, wherein said plurality of bits include a set field and a tag field, wherein said set field includes a first bit, and wherein the tag array contains a row decoder and a selector to select a set in the tag array based on the address received at the first address input without using said first bit in the set field in said received address.

15. The system of claim 14, wherein the tag array contains logic to identify a way in the cache based in part upon said first bit in the set field of the address received at the first address input.

16. The system of claim 15, wherein the shared mode input in the tag array is to receive a cache enable input from the second computing engine.

17. The system of claim 10, wherein the cache contains logic to flush the first subdivision of tag array lines if a different value is received at the shared mode input.

18. A method of allocating subdivisions in a cache which comprises a plurality of locations arranged by set and way, the method comprising:
receiving a first address from a first computing engine, wherein the first address comprises a plurality of bits, wherein said plurality of bits include a set field and a tag field, wherein said set field includes a first bit;
receiving a second address from a second computing engine;
receiving a shared mode value;
dynamically allocating a first subdivision of sets of locations in each way in a tag array in the cache for exclusive access by the first computing engine or for exclusive access by the second computing engine based upon the received shared mode value;
dynamically allocating a first subdivision of sets of lines in a data array in the cache for exclusive access by the first computing engine or for exclusive access by the second computing engine based upon the received shared mode value;
selecting a set in the tag array based on said first address without using said first bit in the set field of said first address; and
identifying a way in the cache based in part upon said first bit in the set field of said first address.

19. The method of claim 18, wherein the shared mode value comprises a cache enable signal from the second computing engine.

20. The method of claim 18, wherein the method further comprises flushing the first subdivision of tag array lines whenever a different shared mode value is received.

21. A cache, comprising:

a tag array comprising a first address input to receive an address from a first computing engine, a second address input to receive an address from a second computing engine, a shared mode input to receive a shared mode value, and a plurality of tag array lines arranged into a plurality of sets and ways, wherein a first subdivision of said sets of tag array lines in each of said ways may be dynamically allocated either for exclusive access by the first computing engine or for exclusive access by the second computing engine, wherein said allocation is based upon the shared mode value received at the shared mode input, wherein the first address input receives an address that comprises a plurality of bits, wherein said plurality of bits include a set field and a tag field, wherein said set field includes a first bit, and wherein the tag array contains a row decoder and a selector to select a set in the tag array based on the address received at the first address input without using said first bit in the set field of said received address, wherein the tag array contains logic to identify a way in the cache based in part upon said first bit in the set field of the address received at the first address input; and a data array electrically coupled to the tag array.

22. The cache of claim 21, wherein the plurality of sets of tag array lines in the tag array also includes a second subdivision of said sets, and wherein sets of tag array lines in the second subdivision are allocated for exclusive access by the first computing engine regardless of the shared mode value received at the shared mode input, wherein the plurality of tag array lines in the first subdivision are in a first bank of sets and the plurality of tag array lines in the second subdivision are in a second bank of sets.

23. The cache of claim 22, wherein the tag array further comprises a row decoder to select a set of tag array lines in the first subdivision, wherein the first address input, second address input, and shared mode input are coupled to a selector, and wherein said row decoder is coupled to said selector to receive an address for either the first computing engine or the second computing engine depending upon the value received at the shared mode input.

24. The cache of claim 21, wherein the data array comprises a plurality of sets of data array lines, wherein a first subdivision of said sets of data array lines may be dynamically allocated either for exclusive access by the first computing engine or for exclusive access by the second computing engine.

25. The cache of claim 24, wherein the plurality of sets of tag array lines also includes a second subdivision of said sets, wherein the plurality of sets of data array lines also includes a second subdivision of said sets, and wherein sets in said second subdivision of tag array lines and sets in said second subdivision of data array lines are allocated for exclusive access by the first computing engine regardless of the shared mode value received at the shared mode input.

26. The cache of claim 21, wherein the shared mode input in the tag array is to receive a cache enable signal from the second computing engine.

27. The cache of claim 21, wherein the cache contains logic to flush the first subdivision of tag array lines if a different value is received at the shared mode input.

* * * * *